United States Patent [19]

Dennis et al.

[11] Patent Number: 4,782,694
[45] Date of Patent: Nov. 8, 1988

[54] PRESSURE COMMUNICATING, FLUID ISOLATING INTERFACE

[75] Inventors: John R. Dennis; Billy W. White, both of Duncan, Okla.

[73] Assignee: Halliburton Company, Duncan, Okla.

[21] Appl. No.: 21,835

[22] Filed: Mar. 4, 1987

[51] Int. Cl.$^4$ .............................................. E21B 47/06
[52] U.S. Cl. ...................................... 73/155; 210/489
[58] Field of Search ....................... 73/151, 155, 706; 210/510.1, 489

[56] References Cited

U.S. PATENT DOCUMENTS

| | | | |
|---|---|---|---|
| 2,605,902 | 8/1952 | Cartis | 210/510.1 X |
| 2,720,278 | 10/1955 | Wiley | 210/510.1 X |
| 2,979,400 | 4/1961 | Mouwen | 210/510.1 X |
| 3,744,307 | 7/1973 | Harper et al. | 73/706 X |
| 3,856,683 | 12/1974 | Parr | 210/489 X |
| 3,895,527 | 7/1975 | McArthur | 73/151 |
| 3,915,010 | 10/1975 | Tricon | 73/410 |

FOREIGN PATENT DOCUMENTS 951088 8/1982 U.S.S.R. ................................. 73/151

Primary Examiner—Jerry W. Myracle
Attorney, Agent, or Firm—James R. Duzan; E. Harrison Gilbert, III

[57] ABSTRACT

A housing which is connectible to a pressure sensitive tool has a filter cartridge mounted within it to communicate a pressure from an external fluid to a clean fluid contained within the filter cartridge and the tool. The filter cartridge includes one or more filters having a plurality of passageways small enough to hold the clean fluid under pressure equilibrium conditions, but large enough to communicate pressure from the external fluid to the clean fluid. There are enough of such passageways so that it is unlikely that all will become clogged by an contaminants within the external fluid should a portion of the external fluid be sucked in through the filter in response to expansion and contraction phenomena of the clean fluid.

11 Claims, 2 Drawing Sheets

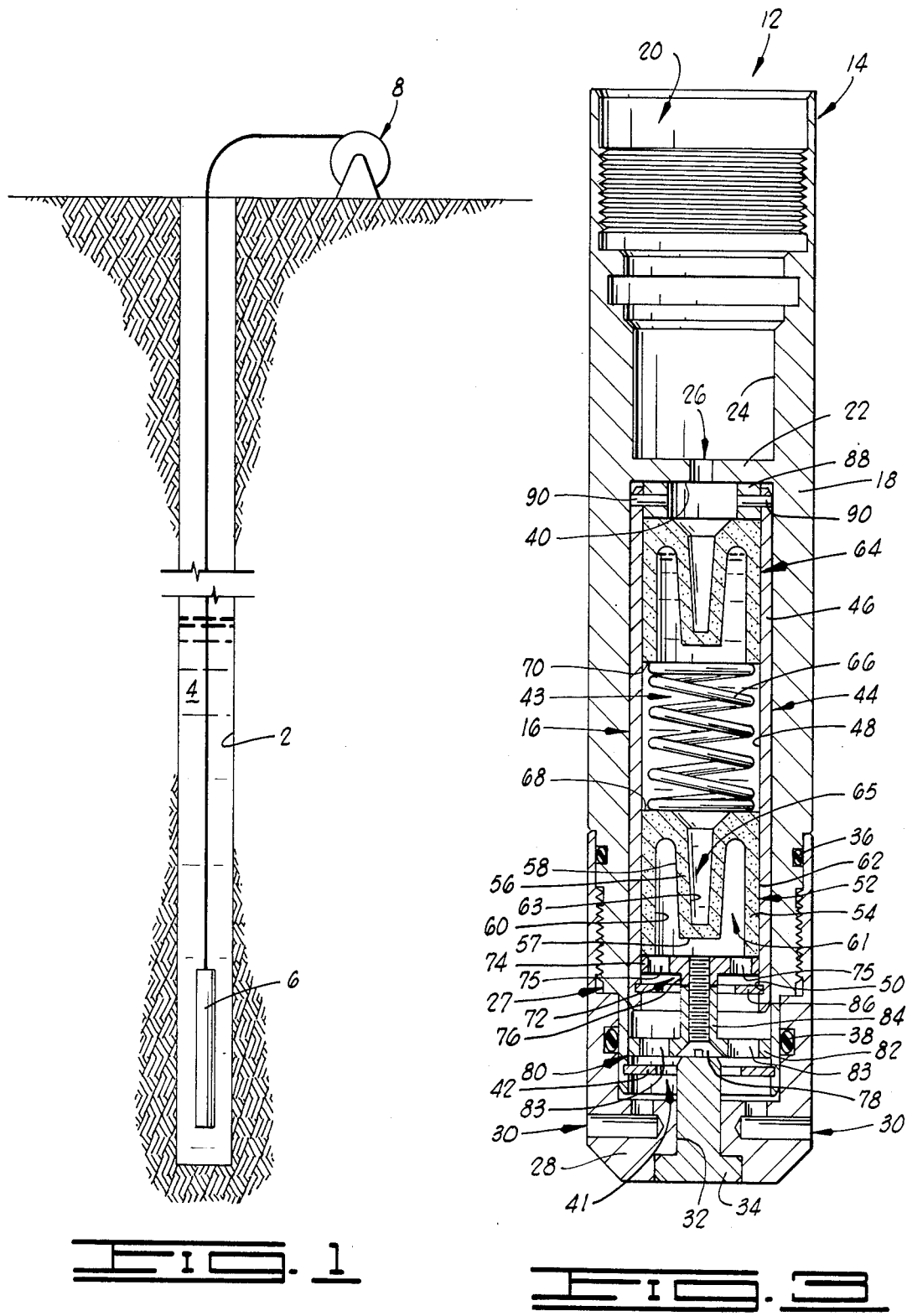

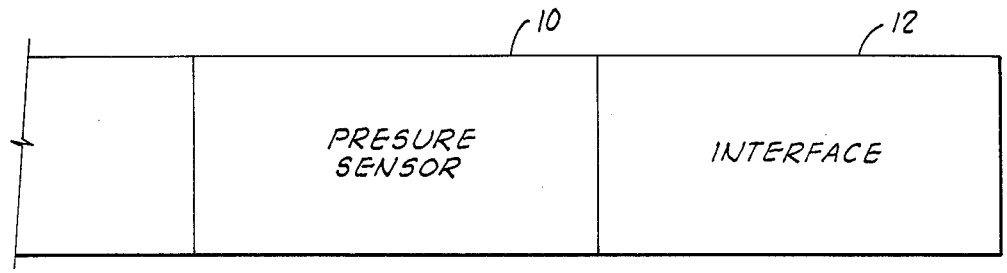
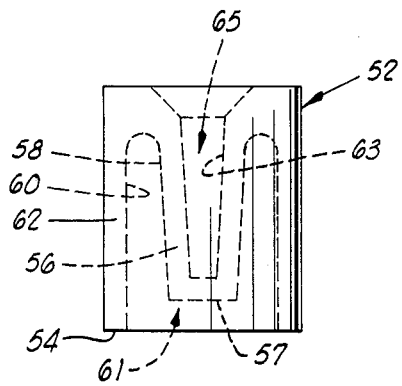 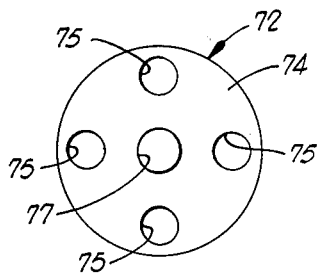
 
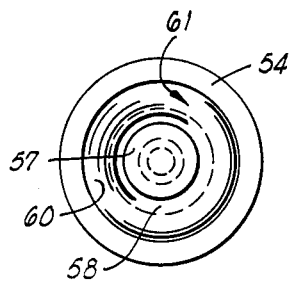 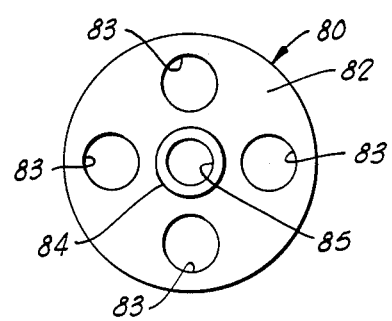
 

PRESSURE COMMUNICATING, FLUID ISOLATING INTERFACE

BACKGROUND OF THE INVENTION

The present invention relates generally to an apparatus for communicating pressure from an external fluid to a pressure sensitive tool and, more particularly, but not by way of limitation, to a filter cartridge for interfacing pressure exerted by a bore hole fluid with a pressure sensitive tool.

In drilling, completing, testing and producing oil or gas wells, there are various objects which are used within the bore hole of the well and to which an external pressure needs to be communicated. Certain types of these objects preferably should not have an external fluid, which is in the bore hole and through which the pressure is exerted, communicated to the object. An example of such a certain type of object is a pressure transducer used for logging or testing to record downhole pressure within the bore hole of an oil or gas well. One specific type of pressure transducer employs a crystal pressure sensing element which is sensitive to the pressure applied to it.

To convey the bore hole pressure to such a pressure sensing element without introducing hysteresis, a long narrow passageway defined by a small diameter coiled tubing, generally known as a "buffer tube," is filled with a clean fluid and exposed at one end to the bore hole fluid. This tubing is connected at its other end to the housing in which the crystal pressure sensing element is held so that the clean fluid in the tubing communicates with a volume of clean fluid surrounding the pressure sensing element. Thus, the coiled tubing defines a single passageway through which the pressure from the bore hole fluid is to be communicated to the pressure sensing element.

This single passageway of the coiled tubing is necessarily of small internal diameter (e.g., 0.06 inch) so that the tubing holds the clean fluid under a condition of pressure equilibrium, but it is large enough (if not blocked) to communicate the pressure from the bore hole fluid through the clean fluid.

When the logging or testing tool is subjected to temperature changes as it is lowered or raised to different depths of the bore hole, the clean fluid is also subjected to such temperature changes. When the change heats the clean fluid, it expands. This expansion forces a quantity of the clean fluid out of the small passageway at the end of the coiled tubing communicating with the bore hole fluid. When the change cools the clean fluid, the fluid contracts, thereby sucking external fluid, including some of the bore hole fluid (which may be drilling mud or other particulate containing mixture) back into the coiled tubing. If enough of the bore hole fluid particles are sucked into the small passageway of the coiled tubing, this passageway becomes blocked, thereby preventing further communication of the bore hole pressure to the pressure sensing element.

To alleviate this problem whereby the single passageway of the coiled tubing becomes blocked, there is the need for an interface which effectively communicates the pressure through a plurality of passageways while isolating the external fluid from the pressure sensing element so that it is less likely all of the plurality of passageways will be blocked under conditions during which a portion of the external fluid may be sucked into one or more of the passageways.

SUMMARY OF THE INVENTION

The present invention provides such an interface by means of a novel and improved apparatus for communicating pressure from an external fluid to a pressure sensitive tool. The preferred embodiment of this invention utilizes a filter in place of the coiled tubing, which filter has a plurality of passageways or pathways. The size of these passageways, combined with the surface tension of a clean fluid used with them, prevents the escape of the clean fluid during an equilibrium pressure condition just the same as with the prior art device utilizing the single passageway of the coiled tubing. Also similarly to the coiled tubing device, the clean fluid within the preferred embodiment of the present invention expands and contracts during heating and cooling; however, the multiple passageways within the present invention reduce the risk of total blockage.

The apparatus of the present invention comprises a housing adapted to connect to a pressure sensitive tool and further adapted to receive an external fluid through which a pressure to be communicated to the pressure sensitive tool is exerted. The apparatus also includes a filter disposed within the housing, which filter has a plurality of passageways through which pressure from the external fluid is communicable to the pressure sensitive tool without communicating the external fluid to the pressure sensitive tool.

In the preferred embodiment the filter forms part of a filter cartridge also including a cartridge shell in which the filter is disposed. The filter cartridge of the preferred embodiment includes another filter disposed within the cartridge shell and spaced from the first filter so that pressure from the bore hole fluid is communicated through the first filter and the second filter.

Therefore, from the foregoing, it is a general object of the present invention to provide a novel and improved apparatus for communicating pressure from an external fluid to a pressure sensitive tool. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 1 is a schematic illustration of a bore hole containing a fluid into which a pressure sensitive tool has been lowered.

FIG. 2 is a block diagram showing that the pressure sensitive tool includes a pressure sensor and an interface for interfacing the pressure from the bore fluid with the pressure sensor.

FIG. 3 is a longitudinal sectional view of the preferred embodiment of the interface of the present invention.

FIG. 4 is a side view of a filter forming a part of the interface apparatus.

FIG. 5 is an end view of the filter shown in FIG. 4.

FIG. 6 is a plan or end view of a piston of the interface.

FIG. 7 is a plan or end view of a plunger cap of the interface.

DETAILED DESCRIPTION OF THE PREFERRED EMBODIMENT

In FIG. 1 there is shown a well bore 2 in which a fluid 4 is present. The fluid 4 is of any type which may be found in a bore hole and through which a pressure is exerted. An example of such a fluid is a drilling mud comprising a mixture including particulate matter.

A pressure sensitive tool 6 is shown in FIG. 1 as having been lowered into the fluid 4. The tool 6 of the specific example used herein measures the bore hole pressure within the fluid 4 at a depth selected through appropriate operation of a schematically illustrated hoisting apparatus 8 of a suitable type as known to the art, such as a wireline, slickline, tubing string or drill pipe string. It is to be noted that the fluid 4 is sometimes referred to herein as the "external fluid" because it is generally external to the tool 6 and because it is the medium through which is exerted the external pressure to be measured by the tool 6.

In FIG. 2 the tool 6 is shown as including a pressure sensor portion 10 and an interface portion 12. The pressure sensor 10 of a particular embodiment includes a crystal pressure sensing element of a type known to the art, such as a type heretofore used with the coiled tubing type of interface; however, other suitable types of sensing elements can be used.

The interface 12 constitutes the present invention to be used in place of the coiled tubing type of interface heretofore used. The interface 12 communicates the pressure from the bore hole fluid 4 to a clean fluid surrounding the pressure sensing element while isolating the pressure sensing element within the pressure sensor 10 from the bore hole fluid 4. To accomplish this, the interface 12 has a plurality of passageways so that this inventive interface is less susceptible to total blockage due to particulate matter which may be in the fluid 4 than is the single coiled tubing type of interface.

The preferred embodiment of the inventive interface 12 is shown in FIG. 3. The interface of the preferred embodiment includes a housing 14 in which a filter cartridge 16 is retained.

The housing 14 includes a cylindrical main body or cartridge receiver 18 having an upper box end 20 which is threaded to connect to a mating end of the pressure sensor 10 of the tool 6. Near the end 20 there is defined an annular retaining or support shoulder 22 extending radially inwardly from an inner surface 24 of the main body 18. The support shoulder 22 has a central aperture 26 defined axially therethrough. The aperture 26 and the communicating cavity or chamber of the box end 20 of the main body 18 define a pressure outlet of the interface 12.

The opposite end of the main body 18 has a threaded pin end 27 to which is connected a cylindrical end piece or cartridge nose 28 having a plurality of pressure inlets 30 defined by joined radial and longitudinal bores. The end piece 28 has an axial opening 32 in which a plug 34 is retained to function as a plunger as more particularly described hereinbelow.

The connection between the main body 18 and the end piece 28 is made fluid-tight by seals 36, 38.

The inner surface 24 of the main body 18 extending between a lower surface 40 of the support shoulder 22 to the lower (as viewed in FIG. 3), pin end 27 of the main body 18 defines a hollow region 41, which communicates the pressure inlets 30 (when the end piece 28 is connected) to the pressure outlet commencing at the aperture 26, and in which the filter cartridge 16 is retained. To prevent the filter cartridge 16 from slipping out of the main body 18 when the end piece 28 is removed, an annular retaining collar 42 is disposed in a circumferential groove defined in the inner surface 24 near the lower end of the main body 18.

The filter cartridge 16 includes a pressure communicating fluid 43 which is received within the housing 14 by being disposed in a means 44 for communicating the pressure from the bore hole fluid 4 to the pressure communicating fluid and for providing a plurality of passageways through which the bore hole fluid 4 and the pressure communicating fluid can flow in response to expansion and contraction of the pressure communicating fluid. In the preferred embodiment the pressure communicating fluid is a clean liquid of a type known in the art and as previously used in pressure transducers with which the prior art coiled tubing interface has been used, such as a silicone oil, synthetic fluid such as an ester-type plasticizer, or other appropriate fluid.

The means 44 includes a cylindrical cartridge shell or sleeve 46 having an outer diameter substantially the same, but slightly less than, the inner diameter of the surface 24 of the housing 14 so that the cartridge shell 46 can be received within the hollow region 41 of the housing 14. The cartridge shell 46 is received so that its upper end is adjacent the support shoulder 22. The cartridge shell 46 has a cylindrical inner surface 48 which defines an axial opening or hollow throughout the length of the cartridge shell 46. Near the lower end of the inner surface 48, there is defined a circumferential groove 50.

The means 44 includes a lower filter 52 disposed within the axial opening of the cartridge shell 46 as shown in FIG. 3. The filter 52 has a plurality of passageways through which pressure from the external fluid 4 communicated up to the filter 52 through the pressure inlets 30 is communicable to the clean fluid contained within the preferred embodiment of the present invention above the filter 52. In the preferred embodiment the filter 52 is a loosely sintered bronze filter specifically defined by a common fuel filter believed to have possibly thousands of passageways or pores which, it is believed, have diameters within the range between approximately 50 microns and approximately 100 microns. This type of filter has a shape as is apparent from FIG. 3 and described as including an annular wall 54 and a tapered wall 56 extending downwardly from the upper end of the annular wall 54 to a lower end surface 57 (thus generally forming the shape of a frustum of a cone) so that an outer surface 58 of the wall 56 faces an inner surface 60 of the wall 54, but is spaced therefrom to define a concavity 61. The tapered wall 56 has an inner surface 63 defining a concavity 65. The wall 54 has an outer surface 62 having a diameter substantially equal to the inner diameter of the surface 48 of the cartridge shell 46 so that a degree of sealing may occur between the surfaces 48, 62. The overall shape of the filter 52, while not critical to the operation of the invention, provides a great increase in wall area over, for example, a disc-shaped filter, and thus provides a correspondingly greater number of passageways through the filter and a reduced risk of clogging.

In general, the size of the passageways defined through the filter 52 are of such a size that the filter 52 can communicate the pressure from the bore hole fluid 4 to the liquid 43 above the filter 52 without the bore hole fluid 4 flowing into the space above the filter 52 except in response to a suction created by cooling the liquid 43 from a heated, expanded state wherein a portion of the liquid has passed downwardly through the filter 52 toward or into or beyond the concavity 61.

The means 54 includes an upper filter 64 constructed substantially identically to the filter 52. The filter 64 is spaced above the filter 52 as shown in FIG. 3. This spacing defines a relatively large volume between the two filters 52, 64 compared to the volume of clean liquid surrounding the pressure sensing element in the pressure sensor 10; therefore, "clogging" material and other "contaminants" drawn in through the filter 52 in response to cooling of the clean liquid would more likely collect in this larger "buffer" volume and thus not pass on through the filter 64. This construction provides the filter 64 as a backup to the filter 52 should the filter 52 somehow become totally clogged. In such a situation, the pressure would act on the filter 52 to allow the pressure to pass between the surfaces 48, 62 or to move the filter 52 toward the filter 64 and open a bypass defined in or through the surface 48 of the cartridge shell 46. Such a bypass could be a longitudinal groove defined in the surface 48 and having one end communicating with the region between the filters 52, 64 and having another end normally terminating adjacent the filter 52 near its lower end, which other end would become uncovered in response to the pressure moving the fully clogged filter 52 upwardly toward the filter 64.

As shown in FIG. 3, the filter 64 is disposed between the pressure communicating fluid 43 which is contained within the cartridge shell 46 between the two filters 52, 64 and the pressure outlet beginning at the aperture 26 defined axially through the support shoulder 22. When the interface 12 is connected to the rest of the pressure transducer for the example described herein, the clean fluid is also contained within the region above the filter 64 through the pressure outlet and on into the pressure sensor 10.

The means 44 also includes biasing means for holding the filters 52, 64 spaced from each other so that a desired volume is defined between the two filters to hold the pressure communicating fluid. In the illustrated preferred embodiment, the biasing means is defined by a helically coiled spring 66 having a lower end engaging an upper surface 68 of the filter 52 and having an upper end engaging a lower surface 70 of the filter 64.

To insure that the two filters 52, 64 engage the spring 66, the means 44 further includes a piston 72 and piston drive means for moving the piston 72 against the filter 52 so that the filter 52 compresses the spring against the filter 64. The piston 72 has a circular disk portion 74 through which four longitudinal openings 75 are defined as best shown in FIG. 6. A short neck portion 76 extends axially from the disk portion 74. A threaded bore 77 is defined through the neck 76 and the disk 74 for receiving the threads of a screw 78 used to hold a plunger cap 80 to the piston 72.

The plunger cap 80 forms part of the piston drive means which is completed by the plug 34 which engages a circular disk portion 82 of the plunger cap 80 when the plug 34 is installed as illustrated in FIG. 3. Extending axially from the disk portion 82 is a long neck portion 84 which is aligned with the neck portion 76 of the piston 72. As shown in FIG. 7, four openings 83 are defined through the disk portion 82, and a threaded bore 85 extends through the neck portion 84 to receive the screw 78.

The piston 72 is slidably received within the interior of the cartridge shell 46. As shown in FIG. 3, the outer diameter of the circular disk portion 74 of the piston 72 is substantially the same as the diameter of the inner surface 48 of the cartridge shell 46, except that the outer diameter of the disk portion 74 is sufficiently less to allow the piston 72 to slide relative to the cartridge shell 46. When the piston drive means is not acting on the piston 72, the piston 72 is prevented from falling out of the cartridge shell 46 by a lower retainer ring 86 held in the groove 50 of the cartridge shell 46.

At the other end of the cartridge shell 46, the filter 64 is held within the shell 46 by means of an upper retainer ring or collar 88 secured to the cartridge shell 46 by one or more roll pins 90 extending radially through radially aligned openings in the cartridge shell 46 and the retainer ring 88.

The means 44 can further include seals of a suitable type for use as needed in directing where the pressure and fluids flow.

As previously mentioned, the filters 52, 64 of the preferred embodiment are made of loosely sintered bronze. However, other suitable filter media known in the art, such as ceramics, may also be employed. As a rule, however, the passageways through the filter should not be larger than approximately 100 microns in order to assure the blockage of potentially damaging particulate matter by the filter. The other elements of the means 44 are made of any suitable material, such as stainless steel. The housing 14 is made of any suitable material, such as a high nickel bearing alloy. The illustrated seals are made of any of a number of sealing materials known in the art and suitable for the borehole temperatures to be encountered.

When the interface 12 is used, the pressure outlet end 20 is connected to the pressure sensor 10. The tool containing these two portions is lowered into the bore hole 2 on the hoisting apparatus 8 to a selected downhole location. The bore hole fluid 4 enters the pressure inlets 30 and flows upwardly through the various openings of the retaining collar 42, the disk portion 82 of the plunger cap 80, the retaining ring 86 and the disk portion 74 of the piston 72 into the concavity 61 of the filter 52. The pressure from this fluid is transferred through the minute passageways of the filter 52 to the clean fluid contained in the concavity 65 and above the filter 52. This pressure is then communicated through the body of clean fluid extending upwardly through the filter 64, the pressure outlet end 20 and on into the pressure sensor 10 having the pressure sensing element which detects the applied pressure.

When the clean fluid is sufficiently heated, it expands and is forced downwardly through the filter 52. When this heated fluid cools, it contracts and draws back up through the filter 52, sucking with it a quantity of the bore hole fluid 4. These phenomena of expansion and contraction operate the same as in the prior art coiled tubing interface; however, in the present invention, it is contemplated that because of the many passageways defined through the filter 52, it is unlikely that all of such passageways will become clogged to the extent of preventing pressure communication from the bore hole fluid 4 to the clean fluid and on to the pressure sensor portion 10. That is, it is contemplated that there is less chance of the filter 52 becoming totally clogged, as compared to the prior art single passageway coiled tubing, as a result of the expansion and contraction phenomena.

Should, however, the filter 52 become totally clogged, the filter 64 acts as a backup which has even less of a chance of becoming totally clogged because any "contaminants" sucked in through the filter 52 likely will travel no farther than the relatively large space defined between the filters 52, 64.

Thus, the present invention is well adapted to carry out the objects and attain the ends and advantages mentioned above as well as those inherent therein. While a preferred embodiment of the invention has been described for the purpose of this disclosure, changes in the construction and arrangement of parts can be made by those skilled in the art, which changes are encompassed within the spirit of this invention as defined by the appended claims.

What is claimed is:

1. An apparatus for communicating pressure from a bore hole fluid between a pressure inlet receiving the bore hole fluid and a pressure outlet while isolating the bore hole fluid from the pressure outlet, said apparatus comprising:
   a housing having the pressure inlet and the pressure outlet defined therein and further having a hollow region defined therein between the pressure inlet and the pressure outlet;
   a pressure communicating fluid received in said housing; and
   means, disposed within said hollow region, for communicating the pressure from the bore hole fluid to said pressure communicating fluid and for providing a plurality of passageways through which the bore hole fluid and the pressure communicating fluid can flow in response to expansion and contraction of said pressure communicating fluid, said means including:
   a filter disposed within said housing between the pressure inlet and said pressure communicating fluid, said filter having said plurality of passageways;
   another filter disposed within said housing between said pressure communicating fluid and the pressure outlet; and
   biasing means, disposed within said housing between said two-mentioned filters, for holding said filters spaced from each other so that a volume is defined between said filters, said volume having said pressure communicating fluid therein.

2. An apparatus as defined in claim 1, wherein each of said passageways has a diameter within the range between approximately fifty microns and approximately one hundred microns.

3. An apparatus as defined in claim 1, wherein said filter includes a sintered bronze body through which said plurality of passageways are defined.

4. An apparatus as defined in claim 3, wherein said sintered bronze body includes:
   an annular wall; and
   a tapered wall extending from one end of said annular wall so that an outer surface of said tapered wall faces, but is spaced from, an inner surface of said annular wall.

5. A filter cartridge for interfacing pressure exerted by a bore hole fluid with a pressure sensitive tool, said cartridge comprising:
   a cartridge shell;
   a first filter disposed within said cartridge shell;
   a second filter disposed within said cartridge shell and spaced from said first filter so that pressure from the bore hole fluid is communicated through said first filter and said second filter;
   a spring disposed in said cartridge shell for separating said first and second filters; and
   piston means, slidably disposed within said cartridge shell adjacent said first filter, for moving said first filter against said spring.

6. A filter cartridge as defined in claim 5, further comprising a liquid disposed between said first and second filters.

7. A filter cartridge as defined in claim 6, wherein said first filter communicates the pressure from the bore hole fluid to said liquid without the bore hole fluid flowing into the space between said first and second filters except in response to a suction created by cooling said liquid from a heated, expanded state wherein a portion of said liquid has passed through said first filter.

8. A filter cartridge as defined in claim 5, wherein each of said first and second filters includes a porous body.

9. A filter cartridge as defined in claim 8, wherein each porous body is defined as a loosely sintered body including pores having diameters within the range between approximately fifty microns and approximately one hundred microns.

10. A filter cartridge as defined in claim 5, wherein said first filter includes a loosely sintered body.

11. A filter cartridge as defined in claim 5, wherein said first filter includes a ceramic body.

* * * * *